(No Model.)

A. H. BUCKINGHAM & A. G. HOHENSTEIN.
HORSE HITCHING DEVICE.

No. 340,905. Patented Apr. 27, 1886.

Witnesses
J. H. Shumway
Fred C. Earle

Alexander H. Buckingham
and Archie G. Hohenstein
Inventors.
By Atty.
Wm E. Earle

UNITED STATES PATENT OFFICE.

ALEXANDER H. BUCKINGHAM, OF NEW HAVEN, CONNECTICUT, AND ARCHIE G. HOHENSTEIN, OF NEW YORK, N. Y.; SAID HOHENSTEIN ASSIGNOR TO SAID BUCKINGHAM.

HORSE-HITCHING DEVICE.

SPECIFICATION forming part of Letters Patent No. 340,905, dated April 27, 1886.

Application filed February 8, 1886. Serial No. 191,132. (No model.)

*To all whom it may concern:*

Be it known that we, ALEXANDER H. BUCKINGHAM, of New Haven, county of New Haven, State of Connecticut, and ARCHIE G. HOHENSTEIN, of New York, in the county of New York and State of New York, have invented a new Improvement in Hitching Devices; and we do hereby declare the following, when taken in connection with the accompanying drawings and the letters of reference marked thereon, to be a full, clear, and exact description of the same, and which said drawings constitute part of this specification, and represent, in—

Figure 1:
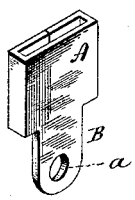
Figure 2:
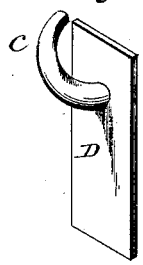
Figure 3:
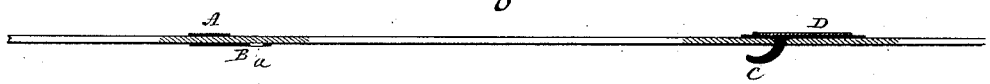
Figure 4:
Figure 5:
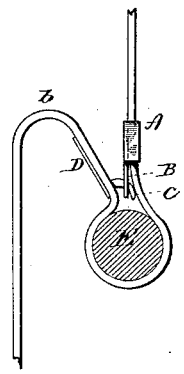
Figure 6:
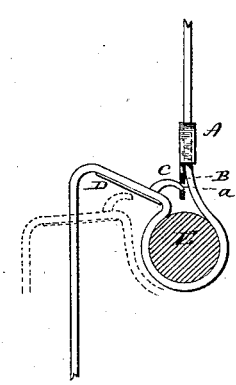
Figure 7:
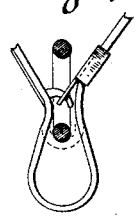

Figure 1, a perspective view of the slide; Fig. 2, a perspective view of the hook; Fig. 3, a longitudinal central section through a rein, showing the hook and slide applied; Figs. 4 and 5, illustrations of hitching directly to a post; Fig. 6, the same as Fig. 5 illustrating the unhitching operation; Fig. 7, the hitch as made to a ring.

This invention relates to a device for hitching and unhitching horses, the object being to provide an attachment for driving-reins by which the horse may be hitched, and so that sitting in the carriage and pulling upon the rein the hitch may be detached, and so that the driver may be seated in the carriage before the horse is unhitched; and the invention consists in a hook fixed upon the rein, opening toward the bit, combined with a slide on the rein between the said hook and bit, and said slide provided with an eye adapted to engage said hook, the slide permitting the loop formed by the rein between the hook and slide to be drawn tight around the post or to whatever the horse may be hitched.

A represents the slide, which is in the form of a flat tube adapted to be placed upon the rein, and so as to slide longitudinally thereon. It is made from thin metal, so as to form but a slight projection upon the rein. From one side extends an ear, B, in which is an opening, a.

C is the hook, which is fixed to or made a part of a flat thin base, D, the hook adapted to pass through a hole made in the rein, so as to bring the base upon the inside of the rein while the hook projects on the outside and as seen in Fig. 3. The hook is arranged near one end of the plate, and preferably so that its point will extend beyond that end. The hook is introduced through the rein, as seen in Fig. 3, to bring the plate flat against the inside, and may be secured by covering the plate with a thin piece of leather, as indicated in Fig. 3, the mouth or point of the hook being toward the bit to which the rein is attached. The hook is curved from the rein to its point, and so as to bring the nose of the hook nearer the rein than the body of the hook and back of the nose; but so as to leave sufficient space between the point of the hook and the surface of the rein for the extension B of the slide to pass in. The hook should be distant from the bit far enough to give the required length for the hitch.

In hitching the horse—say to a post, as seen in Fig. 4—the part of the rein between the hook and slide is passed around the post E, as seen in Fig. 4, the hook introduced into the hole in the slide, as seen in Fig. 4, and then the rein forward of the slide drawn upon until the loop is drawn tight around the post, as seen in Fig. 5. In this condition the harder the horse draws upon the rein the tighter will be the grasp. The rein at the rear of the hook is thrown forward by the engagement, as seen at *b*, Fig. 5. To unhitch, it is only necessary to pull backward upon the rear part of the rein, as seen in Fig. 6, in doing which the hook will be turned out from the hole in the slide and so as to escape therefrom, as indicated in broken lines, Fig. 6. To hitch to a ring, the hook and slide are engaged through the ring, as seen in Fig. 7, then the rein drawn up, as indicated in broken lines in that figure, the unhitching being performed in the same manner as when hitched to a post. These illustrations of making the hitch will be sufficient to enable others to adapt the invention to various hitching-places.

The hook, being rounded or segment-shaped, and on the flat side of the rein, will readily pass through the terret. The space between the rein and the nose of the hook is so slight as not to be liable to catch upon any part of the harness. The space need be little greater than the thickness of the projection B from the slide. If a greater length of line is required for the hitch, the hook will be placed farther from the bit, and vice versa.

We do not claim, broadly, an attachment for driving-reins, whereby the horse may be hitched by the driving-rein and the disengagement produced from a pull upon the line at the rear, as such we are aware is not new; but What we do claim is—

1. As an article of manufacture, the herein-described hitching device for driving-reins, consisting of the slide A, adapted to be placed and movable longitudinally upon the driving-rein, and constructed with an opening, $a$, combined with the segment-shaped hook C, also adapted for attachment to the same rein, substantially as described.

2. The herein-described hitching device, consisting of the driving rein, the hook C, fixed upon the rein and projecting from one of the flat sides thereof, with its open end toward the bit, combined with the slide A, arranged upon the rein between the said hook and the bit-ring, and constructed with an opening, $a$, therein toward said hook, the said opening adapted to be engaged with and disengaged from said hook, substantially as described.

ALEX. H. BUCKINGHAM.
ARCHIE G. HOHENSTEIN.

Witnesses as to signature of Alex. H. Buckingham:

JOHN E. EARLE,
FRED C. EARLE.

Witnesses as to signature of Archie E. Hohenstein:

WM. BARKER,
W. G. NEAR.